(12) United States Patent
Chou et al.

(10) Patent No.: US 7,433,134 B2
(45) Date of Patent: Oct. 7, 2008

(54) LENS FOR SIDEWARD LIGHT EMISSION

(75) Inventors: Wei-Jen Chou, Miao Li County (TW); Shih-Yuan Yu, Miao Li County (TW)

(73) Assignee: Young Lighting Technology Corporation, Hsinchu (TW)

( * ) Notice: Subject to any disclaimer, the term of this patent is extended or adjusted under 35 U.S.C. 154(b) by 0 days.

(21) Appl. No.: 11/402,440

(22) Filed: Apr. 11, 2006

(65) Prior Publication Data

US 2006/0245083 A1 Nov. 2, 2006

(30) Foreign Application Priority Data

Apr. 19, 2005 (TW) .............................. 94112376 A

(51) Int. Cl.
*G02B 17/00* (2006.01)
*G02B 13/18* (2006.01)
*G02B 3/02* (2006.01)
*F21V 5/00* (2006.01)

(52) U.S. Cl. ..................... 359/726; 359/712; 362/327

(58) Field of Classification Search ................ 359/708, 359/712, 718, 726, 737; 362/335–336, 326–327
See application file for complete search history.

(56) References Cited

U.S. PATENT DOCUMENTS

| 6,536,923 | B1 * | 3/2003 | Merz ........................... 362/327 |
| 6,607,286 | B2 | 8/2003 | West ........................... 362/255 |
| 6,679,621 | B2 | 1/2004 | West ........................... 362/327 |
| 7,083,313 | B2 * | 8/2006 | Smith .......................... 362/555 |
| 2003/0235050 | A1 * | 12/2003 | West et al. .................. 362/327 |
| 2005/0286251 | A1 * | 12/2005 | Smith .......................... 362/327 |
| 2006/0083003 | A1 * | 4/2006 | Kim et al. .................... 362/327 |

* cited by examiner

*Primary Examiner*—Alicia M Harrington
(74) *Attorney, Agent, or Firm*—Ladas & Parry, LLP

(57) ABSTRACT

A lens defines central axis, and includes a light receiving surface, a light reflecting surface, and a light exiting surface. The light reflecting surface is opposite to the light receiving surface along the central axis. The light exiting surface extends between the light receiving surface and the light reflecting surface. When a light source emits a light, a portion of the light emitted by the light source passes through the light receiving surface, and is incident on and is reflected at a plurality of reflections angles by the light reflecting surface to the light exiting surface so as to exit the lens in directions perpendicular to the light exiting surface for all said plurality of reflection angles.

22 Claims, 4 Drawing Sheets

LENS FOR SIDEWARD LIGHT EMISSION

CROSS-REFERENCE TO RELATED APPLICATION

This application claims priority of Taiwanese application no. 094112376, filed on Apr. 19, 2005.

BACKGROUND OF THE INVENTION

1. Field of the Invention

This invention relates to a lens, more particularly to a lens that guides emission of light sideways.

2. Description of the Related Art

In U.S. Pat. No. 6,679,621, there is disclosed a conventional lens that serves to guide light emitted by a light source sideways. The conventional lens defines a central axis, and includes a bottom surface, a reflecting surface, and a refracting surface.

When the light source emits light, a portion of the light passes through the bottom surface, is incident on and is reflected by the reflecting surface to the refracting surface, and is refracted by the refracting surface such that the light exits the lens in lateral directions relative to the central axis. Moreover, another portion of the light passes through the bottom surface, and is refracted by the refracting surface such that the light exits the lens in lateral directions relative to the central axis.

The aforementioned conventional lens is disadvantageous in that, since the light reflected by the reflecting surface to the refracting surface forms an oblique angle with the refracting surface, a portion of the light is reflected by the refracting surface, thereby decreasing the efficiency of the light emitted through the lens by the light source.

In U.S. Pat. No. 6,607,286, there is disclosed another conventional side emitting lens. The conventional lens includes a sawtooth-shaped light exiting surface. This makes fabrication of the conventional lens relatively difficult.

SUMMARY OF THE INVENTION

Therefore, the object of the present invention is to provide a lens that is capable of overcoming the aforesaid drawbacks of the conventional lens.

According to one aspect of the present invention, a lens for sideward light emission defines a central axis, and includes a light receiving surface, a parabolic light reflecting surface, and a light exiting surface. The parabolic light reflecting surface is opposite to the light receiving surface along the central axis, is symmetrical with respect to the central axis, and defines a focal point on the central axis. The light exiting surface extends between the light receiving surface and the light reflecting surface, and has a segment proximate to the light reflecting surface. Accordingly, a portion of light emitted by a light source disposed at the focal point passes through the light receiving surface, and is incident on and is reflected by the light reflecting surface to the segment of the light exiting surface so as to exit the lens in directions perpendicular to the segment of the light exiting surface.

According to another aspect of the present invention, a lens for sideward light emission defines a central axis, and includes a light receiving surface, a light reflecting surface, and a light exiting surface. The light reflecting surface is opposite to the light receiving surface along the central axis. The light exiting surface extends between the light receiving surface and the light reflecting surface and has a segment that is proximate to the light reflecting surface. Accordingly, a portion of light emitted by a light source passes through the light receiving surface, and is incident on and is reflected by the light reflecting surface to the segment of the light exiting surface so as to exit the lens in directions perpendicular to the segment of the light exiting surface.

According to yet another aspect of the present invention, a lens for sideward light emission defines a central axis, and includes a light receiving surface, a light reflecting surface, and a light exiting surface. The light reflecting surface is opposite to the light receiving surface along the central axis. The light exiting surface extends between the light receiving surface and the light reflecting surface, and has a segment that forms an oblique angle with respect to the central axis. Accordingly, a portion of light emitted by a light source passes through the light receiving surface, and is incident on and is reflected by the light reflecting surface to the segment of the light exiting surface so as to exit the lens in directions perpendicular to the segment of the light exiting surface.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
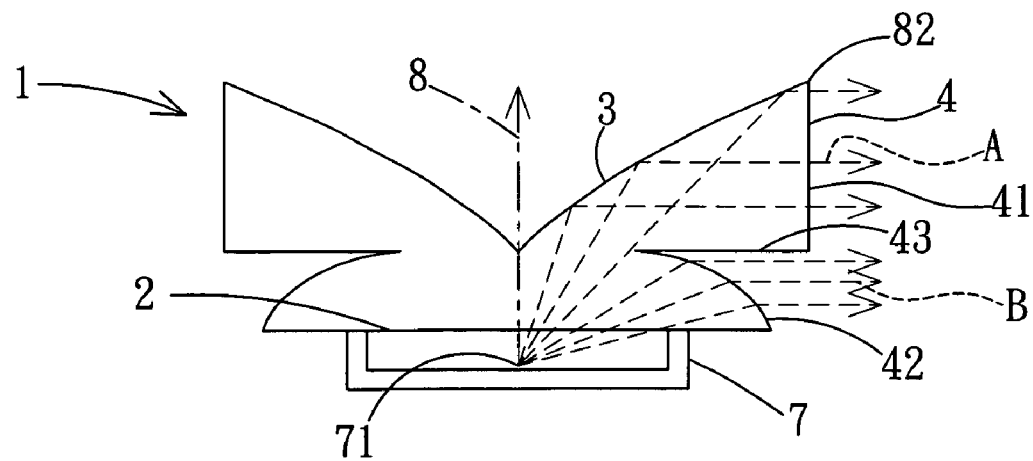
FIG. 1 is a schematic view of a first preferred embodiment of a lens according to the present invention.

Before the present invention is described in greater detail, it should be noted that like elements are denoted by the same reference numerals throughout the disclosure.

Referring to FIG. 1, a first preferred embodiment of a lens 1, which defines a central axis 8, according to this invention is shown to include a light receiving surface 2, a light reflecting surface 3, and a light exiting surface 4.

The lens 1 serves to guide a light emitted by a light source 7, such as a light-emitting diode (LED), in a manner that will be described hereinafter.

The light reflecting surface 3 is opposite to the light receiving surface 2 along the central axis 8 and is symmetrical with respect to the central axis 8. In this embodiment, the light reflecting surface 3 is generally parabolic in shape and defines a focal point 71 on the central axis 8. In particular, the light reflecting surface 3 is a conic surface that is produced by rotating a parabolic arc about the central axis 8. Preferably, the light reflecting surface 3 is coated with a highly reflective material to increase reflection efficiency thereof.

The light exiting surface 4 extends between the light receiving surface 2 and the light reflecting surface 3, and has a first segment 41 that is proximate to the light reflecting surface 3 and that extends parallel to the central axis 8 in this embodiment. Preferably, a lowermost edge of the first segment 41 is disposed on a same height as a lowermost point of the light reflecting surface 3.

A first portion of the light emitted by the light source 7 disposed at the focal point 71 forms an angle of less than 45 degrees with the central axis 8, passes through the light receiving surface 2, and is incident on and is totally reflected by the light reflecting surface 3 to the first segment 41 of the light exiting surface 4 so as to exit the lens 1 in directions perpendicular to the first segment 41, as indicated by arrow (A).

It is noted that the first portion of the light exits the lens 1 in directions perpendicular to the first segment 41 so that an amount of light energy lost, due to reflection, is minimized, thereby increasing the light emission efficiency of the lens 1.

In this embodiment, the light exiting surface 4 further has a second segment 42 that is proximate to the light receiving surface 2, that is symmetrical with respect to the central axis 8, and that is in a form of a smooth curved surface.

Referring to FIG. 1, a second portion of the light emitted by the light source 7 disposed at the focal point 71 passes through the light receiving surface 2, and is incident on and is refracted by the second segment 42 of the light exiting surface 4 so as to exit the lens 1 in the directions perpendicular to the central axis 8, as indicated by arrow (B).

The light exiting surface 4 further has a third segment 43 that interconnects the first and second segments 41, 42 of the light exiting surface 4, and that forms an angle with the central axis 8 larger than an angle between a line radiating from the focal point 71 to a junction 82 of the light reflecting surface 3 and the first segment 41 of the light exiting surface 4 with the central axis 8 to facilitate fabrication. In this embodiment, the third segment 43 of the light exiting surface 4 forms a right angle with respect to the central axis 8.

It is noted herein that each of the first, second and third segments 41, 42, 43 of the light exiting surface 4 are symmetrical with respect to the central axis 8.

Figure 2:
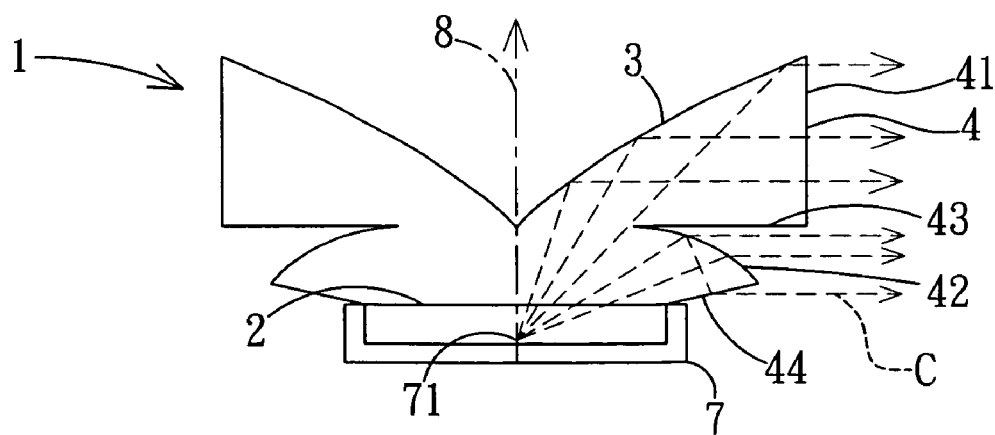
FIG. 2 is a schematic view of a second preferred embodiment of a lens according to the present invention.

FIG. 2 illustrates a second preferred embodiment of a lens 1 according to this invention. Comparing with the first embodiment, the light exiting surface 4 further has a refracting segment 44 that is disposed between the second segment 42 and the light receiving surface 2, and that forms an acute angle with respect to the central axis 8.

A part of the second portion of light is incident on and is reflected by the second segment 42 to the refracting segment 44 of the light exiting surface 4, and is refracted by the refracting segment 44 so as to exit the lens 1 in the directions perpendicular to the central axis 8, as indicated by arrow (C).

Figure 3:
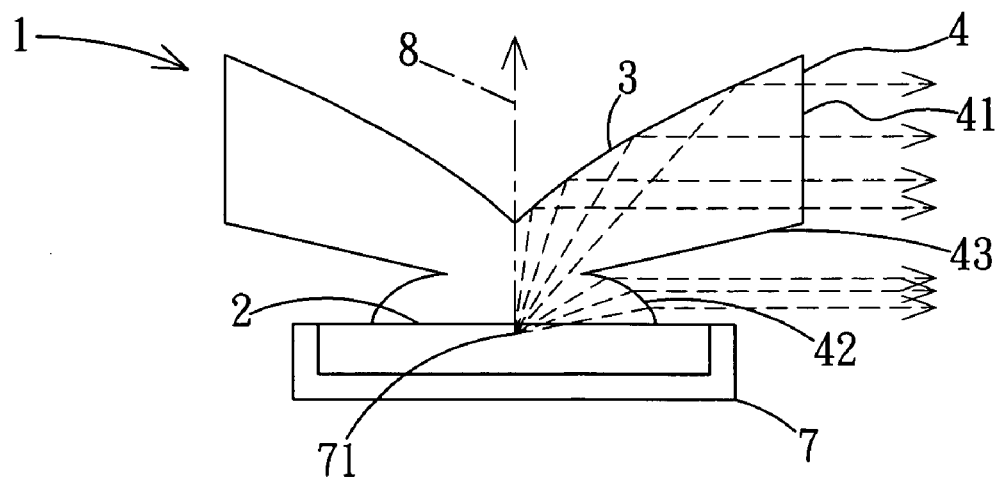
FIG. 3 is a schematic view of a third preferred embodiment of a lens according to the present invention.

FIG. 3 illustrates a third preferred embodiment of a lens 1 according to this invention. Comparing with the first embodiment, the third segment 43 of the light exiting surface 4 is a surface obliquely angled with respect to the central axis 8 so as to facilitate fabrication.

Figure 4:
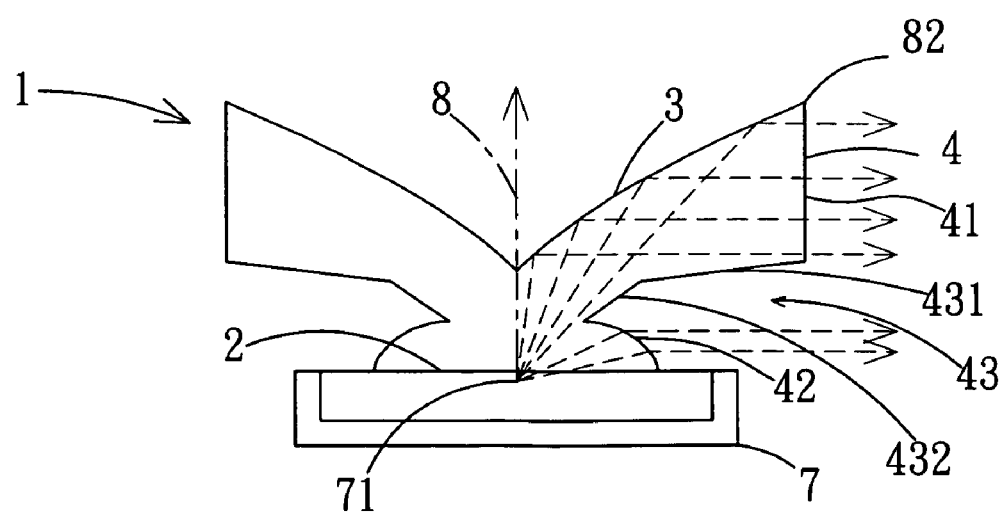
FIG. 4 is a schematic view of a fourth preferred embodiment of a lens according to the present invention.

FIG. 4 illustrates a fourth preferred embodiment of a lens 1 according to this invention. Comparing with the third embodiment, the third segment 43 of the light exiting surface 4 further includes a first sub-segment 431 connected to the first segment 41, and a second sub-segment 432 connected to the second segment 42. In this embodiment, the first and second sub-segments 431, 432 of the third segment 43 of the light exiting surface 4 form different angles with respect to the central axis 8. The first and second sub-segments 431, 432 can facilitate removal of the lens 1 from a mold without affecting adversely the light emission efficiency.

Figure 5:
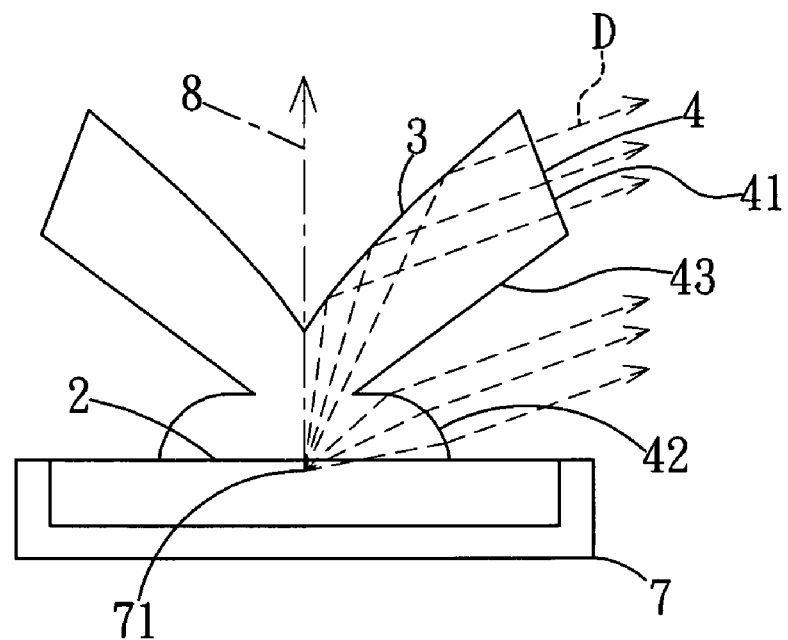
FIG. 5 is a schematic view of a fifth preferred embodiment of a lens according to the present invention.

FIG. 5 illustrates a fifth preferred embodiment of a lens according to this invention. Comparing with the third embodiment, the first segment 41 of the light exiting surface 4 forms an oblique angle with respect to the central axis 8 such that the exiting light forms an acute angle with respect to the central axis 8, as indicated by arrow (D). In this embodiment, the exiting light forms a 70-degree angle with respect to the central axis 8.

Figure 6:
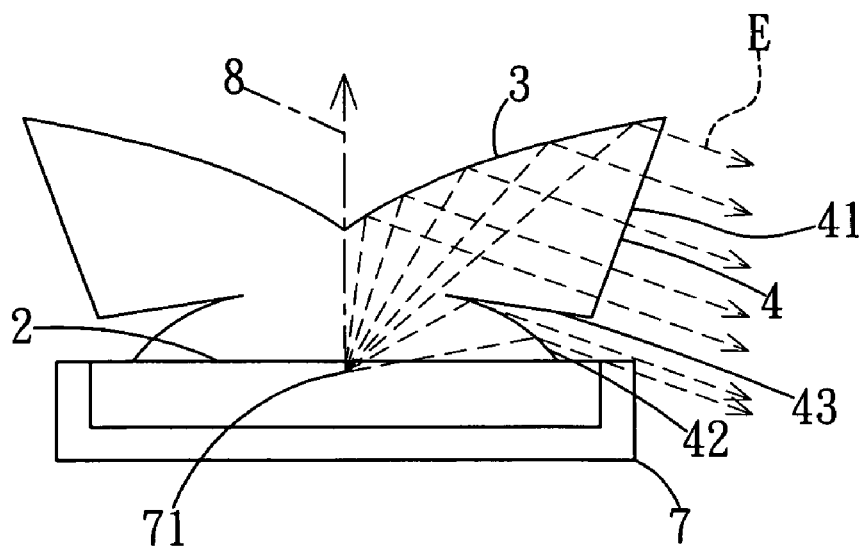
FIG. 6 is a schematic view of a sixth preferred embodiment of a lens according to the present invention.

FIG. 6 illustrates a sixth preferred embodiment of a lens according to this invention. Comparing with the third embodiment, the first segment 41 of the light exiting surface 4 forms an oblique angle with respect to the central axis 8 such that the exiting light forms an obtuse angle with respect to the central axis 8, as indicated by arrow (E). In this embodiment, the exiting light forms a 110-degree angle with respect to the central axis 8.

Figure 7:
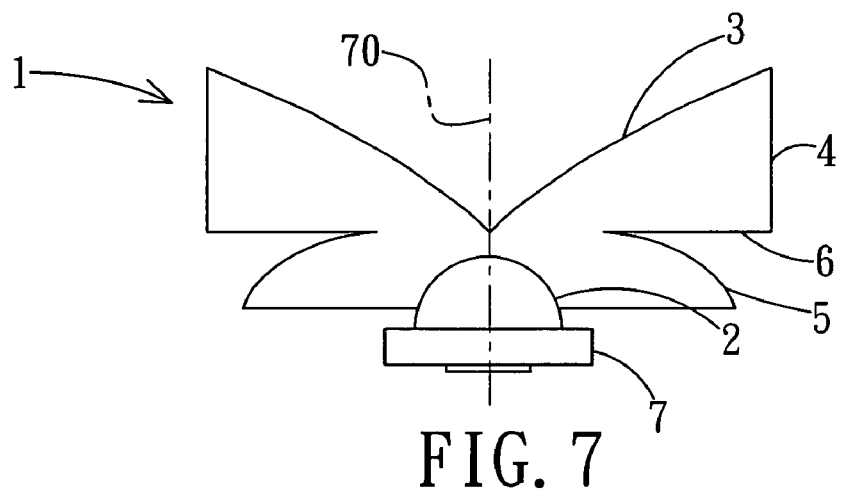
FIG. 7 is a schematic view to illustrate the first preferred embodiment integrated with a hemispherical shell of a light-emitting diode.

As an example of an application of the lens 1 of this invention, as illustrated in FIG. 7, the lens 1 is mounted on a light transmissible hemispherical shell of a light-emitting diode.

Figure 8:
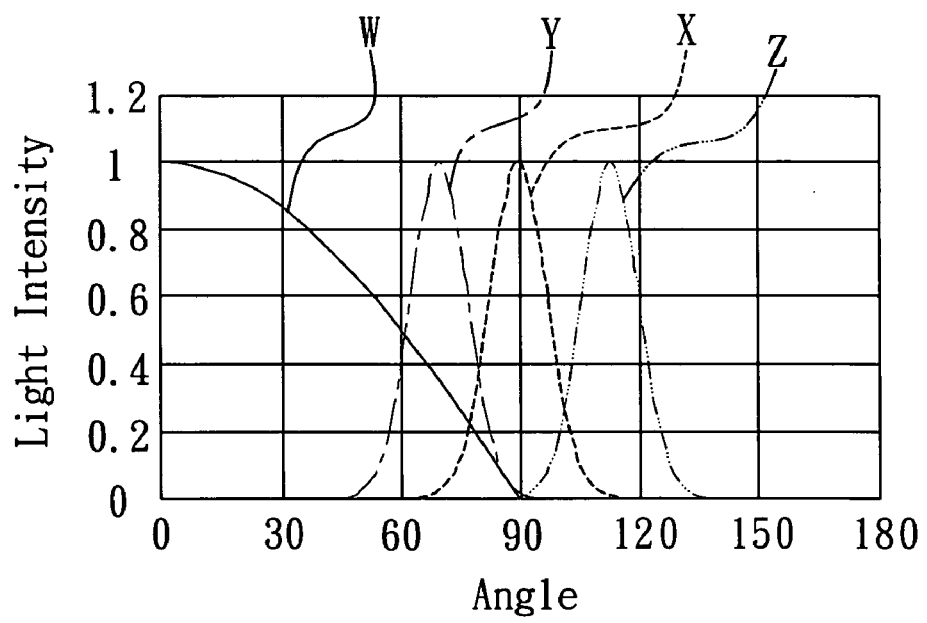
FIG. 8 is a diagram showing the relationship between light intensity and angle of emission.

Based on experimental results, as illustrated in FIG. 8, when one of the first, second, third, and fourth embodiments is used, most of the light emitted by the light source 7 can be directed to an angle of 90 degrees with respect to the central axis 8, as indicated by line (X). Moreover, when the fifth preferred embodiment is used, most of the light emitted by the light source 7 can be directed to an angle of 70 degrees with respect to the central axis 8, as indicated by line (Y). Further, when the sixth preferred embodiment is used, most of the light emitted by the light source 7 can be directed to an angle of 110 degrees with respect to the central axis 8, as indicated by line (Z). It is noted that when the lens 1 of this invention is not in use, most of the light emitted by the light source 7 simply propagates along an optical axis 70 (see FIG. 7) of the light source 7, as indicated by line (W).

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A lens for sideward light emission defining a central axis, comprising:
   a light receiving surface;
   a parabolic light reflecting surface opposite to said light receiving surface along the central axis, said light reflecting surface being symmetrical with respect to the central axis and defining a focal point on the central axis; and
   a light exiting surface extending between said light receiving surface and said light reflecting surface, and having a first segment that is proximate to said light reflecting surface, a second segment that is proximate to said light receiving surface, and a third segment that interconnects said first and second segments of said light exiting surface, said third segment forming an angle with the central axis larger than an angle formed between a line radiating from the focal point to a junction of said light reflecting surface and said first segment of said light exiting surface and the central axis;
   wherein a first portion of light emitted by a light source disposed at the focal point passes through said light receiving surface, and is incident on and is reflected at a plurality of reflection angles by said light reflecting surface to said first segment of said light exiting surface so as to exit said lens in directions perpendicular to said light exiting surface for all said plurality of reflection angles; and wherein a second portion of the light emitted by the light source passes through said light receiving surface, is incident on said second segment of said light exiting surface at a plurality of incident angles, and is refracted by said second segment of said light exiting surface so as to exit said lens in directions perpendicular to said first segment for all said plurality of incident angles.

2. The lens as claimed in claim 1, wherein said first segment of said light exiting surface extends parallel to the central axis.

3. The lens as claimed in claim 1, wherein said first segment of said light exiting surface forms an oblique angle with respect to the central axis such that the exiting light forms an acute angle with respect to the central axis.

4. The lens as claimed in claim 1, wherein said first segment of said light exiting surface forms an oblique angle with respect to the central axis such that the exiting light forms an obtuse angle with respect to the central axis.

5. The lens as claimed in claim 1, wherein each of said first, second and third segments is symmetrical with respect to the central axis.

6. The lens as claimed in claim 1, wherein said third segment of said light exiting surface is a surface obliquely angled with respect to the central axis, and includes a first sub-segment connected to said first segment, and a second sub-segment connected to said second segment, said first and second sub-segments forming different angles with respect to the central axis.

7. The lens as claimed in claim 1, wherein said light exiting surface further comprises a refracting segment disposed between said second segment and said light receiving surface, wherein a part of the second portion of the light that is incident on said second segment of said light exiting surface is reflected by said second segment to said refracting segment, and is refracted by said refracting segment to exit said lens in directions perpendicular to said first segment.

8. A lens for sideward light emission defining a central axis, comprising:

a light receiving surface;

a light reflecting surface opposite to said light receiving surface along the central axis; and a light exiting surface extending between said light receiving surface and said light reflecting surface, and having a first segment that is proximate to said light reflecting surface and that forms an oblique angle with respect to the central axis;

wherein a first portion of light emitted by a light source passes through said light receiving surface, and is incident on and is reflected at a plurality of reflection angles by said light reflecting surface to said first segment of said light exiting surface so as to exit said lens in directions perpendicular to said first segment for all said plurality of reflection; and wherein the exiting light forms an acute angle with respect to the central axis.

9. The lens as claimed in claim 8, wherein said light exiting surface further comprises a second segment proximate to said light receiving surface, wherein a second portion of the light emitted by the light source passes through said light receiving surface, is incident on said second segment of said light exiting surface at a plurality of incident angles, and is refracted by said second segment of said light exiting surface so as to exit said lens in the directions perpendicular to said first segment of said light exiting surface for all said plurality of incident angles.

10. The lens as claimed in claim 9, wherein said light exiting surface further has a third segment that interconnects said first and second segments of said light exiting surface.

11. The lens as claimed in claim 10, wherein each of said first, second and third segments of said light exiting surface is symmetrical with respect to the central axis.

12. A lens for sideward light emission defining a central axis, comprising:

a light receiving surface;

a light reflecting surface opposite to said light receiving surface along the central axis; and a light exiting surface extending between said light receiving surface and said light reflecting surface, and having a first segment that is proximate to said light reflecting surface and that forms an oblique angle with respect to the central axis;

wherein a first portion of light emitted by a light source passes through said light receiving surface, and is incident on and is reflected at a plurality of reflection angles by said light reflecting surface to said first segment of said light exiting surface so as to exit said lens in directions perpendicular to said first segment for all said plurality of reflection angles; and wherein the exiting light forms an obtuse angle with respect to the central axis.

13. The lens as claimed in claim 12, wherein said light exiting surface further comprises a second segment proximate to said light receiving surface, wherein a second portion of the light emitted by the light source passes through said light receiving surface, is incident on said second segment of said light exiting surface at a plurality of incident angles, and is refracted by said second segment of said light exiting surface so as to exit said lens in the directions perpendicular to said first segment of said light exiting surface for all said plurality of incident angles.

14. The lens as claimed in claim 13, wherein said light exiting surface further has a third segment that interconnects said first and second segments of said light exiting surface.

15. The lens as claimed in claim 14, wherein each of said first, second and third segments of said light exiting surface is symmetrical with respect to the central axis.

16. A lens for sideward light emission defining a central axis, comprising:

a light receiving surface;

a light reflecting surface opposite to said light receiving surface along the central axis; and a light exiting surface extending between said light receiving surface and said light reflecting surface, and having a first segment that is proximate to said light reflecting surface, a second segment that is proximate to said light receiving surface, and a third segment that interconnects said first and second segments of said light exiting surface, said third segment being an angled surface, and including a first sub-segment, and a second sub-segment that forms an angle with said first sub-segment;

wherein a first portion of light emitted by a light source passes through said light receiving surface, and is incident on and is reflected at a plurality of reflection angles by said light reflecting surface to said first segment of said light exiting surface so as to exit said lens in directions perpendicular to said first segment for all said plurality of reflection angles; and wherein a second portion of the light emitted by the light source passes through said light receiving surface, is incident on said second segment of said light exiting surface at a plurality of incident angles, and is refracted by said second segment of said light exiting surface so as to exit said lens in the directions perpendicular to said first segment of said light exiting surface for all said plurality of incident angles.

17. The lens as claimed in claim 16, wherein said first segment of said light exiting surface extends parallel to the central axis.

18. The lens as claimed in claim 16, wherein each of said first, second and third segments of said light exiting surface is symmetrical with respect to the central axis.

19. A lens for sideward light emission defining a central axis, comprising:
   a light receiving surface;
   a light reflecting surface opposite to said light receiving surface along the central axis; and
   a light exiting surface extending between said light receiving surface and said light reflecting surface, and having a first segment that is proximate to said light reflecting surface, a second segment that is proximate to said light receiving surface, and a refracting segment that is disposed between said second segment and said light receiving surface;
   wherein a first portion of light emitted by a light source passes through said light receiving surface, and is incident on and is reflected at a plurality of reflection angles by said light reflecting surface to said first segment of said light exiting surface so as to exit said lens in directions perpendicular to said first segment for all said plurality of reflection angles;
   wherein a second portion of the light emitted by the light source passes through said light receiving surface, is incident on said second segment of said light exiting surface at a plurality of incident angles, and is refracted by said second segment of said light exiting surface so as to exit said lens in the directions perpendicular to said first segment of said light exiting surface for all said plurality of incident angles; and
   wherein a part of the second portion of the light that is incident on said second segment of said light exiting surface is reflected by said second segment to said refracting segment, and is refracted by said refracting segment to exit said lens in the directions perpendicular to said first segment of said light exiting surface.

20. The lens as claimed in claim 19, wherein said first segment of said light exiting surface extends parallel to the central axis.

21. The lens as claimed in claim 19, wherein said light exiting surface further has a third segment that interconnects said first and second segments of said light exiting surface.

22. The lens as claimed in claim 21, wherein each of said first, second and third segments of said light exiting surface is symmetrical with respect to the central axis.

* * * * *